L. J. HOUZE.
LANTERN LENS.
APPLICATION FILED MAR. 8, 1913.

1,211,447.

Patented Jan. 9, 1917.

WITNESSES.

INVENTOR.

UNITED STATES PATENT OFFICE.

LEON J. HOUZE, OF POINT MARION, PENNSYLVANIA.

LANTERN-LENS.

1,211,447.

Specification of Letters Patent.

Patented Jan. 9, 1917.

Application filed March 8, 1913. Serial No. 753,115.

*To all whom it may concern:*

Be it known that I, LEON J. HOUZE, a citizen of the United States, and resident of Point Marion, in the county of Fayette and State of Pennsylvania, have invented a new and useful Improvement in Lantern-Lenses; and I do hereby declare the following to be a full, clear, and exact description thereof.

My invention relates to improvements in the light diffusing lenses or front glasses of a lantern, which are particularly advantageous for use with head lights or lights of like character for automobiles, locomotives and other vehicles, though it is to be understood that the device may be applied to lamps or lights used for other purposes.

The object of the invention is more effectively to distribute or diffuse the rays of light from the lamp so as to illuminate a greater area or to distribute the illumination more effectively over those portions of the roadway for example that it is necessary for the driver of a vehicle to see plainly.

With these objects in view, the invention consists in an improved construction and arrangement of lens, preferred embodiments of which are illustrated in the accompanying drawings, in which—

Figure 1:
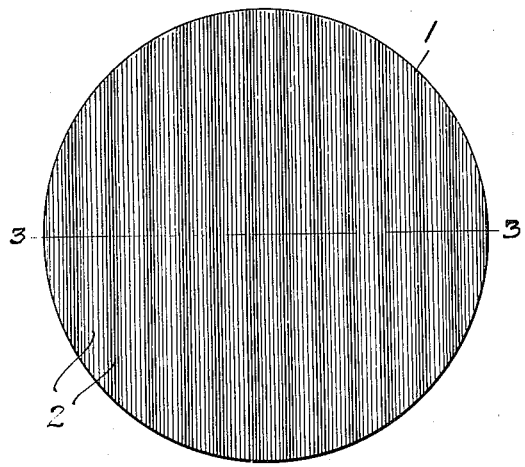
Figure 2:
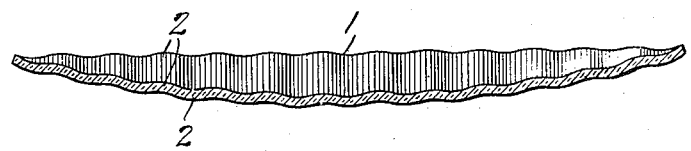
Figure 3:

Figure 1 is a face view of one form of lens; Fig. 2 is a sectional view on the line 3—3 of Fig. 1; Fig. 3 is a transverse sectional view of two superposed lenses illustrating a modified use of the invention; and Fig. 4 is a transverse sectional view of a still further modification of the lens.

In the embodiment of my invention illustrated in Figs. 1 and 2, the device comprises a concavo-convex lens 1 provided throughout its area with parallel corrugations 2. In forming a lens of this character I first produce a corrugated sheet of glass of required thickness by any of the well known methods of window glass manufacture which will impart a well polished surface to each face of the plate. I next take the corrugated sheet, reheat it, and bend the same into the concavo-convex form here shown by means of a suitable bending mold, this operation being also so governed as not to injure the polished surfaces of the lens. The resultant article is a concavo-convex disk or lens with corrugations running parallel across the face thereof. When this lens is mounted in a lamp with the corrugations extending vertically, the rays of light emitted through it are more or less diffused in all directions by the concavo-convex shape of the lens, but are more particularly diffused laterally by reason of the arrangement of the corrugations. Therefore, a single lamp on an automobile, for example, may be utilized to illuminate the entire width of the roadway, while at the same time, convexity of the lens deflects some of the rays downwardly to impinge upon the ground at a short distance in front of the light of the lamp.

It may be desirable in some instances to diffuse the light rays uniformly both laterally and vertically, and in fact in all directions in front of the lantern. To this end I may mount two of the lenses heretofore described in the lantern, one with its corrugations extending vertically and superposed upon the other lens whose corrugations extend horizontally or at right angles to those of the correlated lens. This arrangement is illustrated in cross section in Fig. 3. By this arrangement, and by the use of simple and easily manufactured lenses, I procure a very effective diffusion of light rays in all directions. This is an economical and simple way of securing this result.

Figure 4:
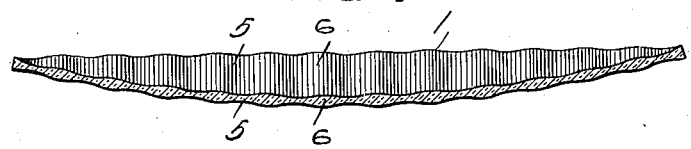

In addition to providing the lens plate with simple corrugations such as heretofore described, somewhat similar light diffusing effects may be secured by a structure of lens such as that shown in Fig. 4 in which the body of the lens is provided with alternately arranged thin and thick portions 5 and 6, respectively. This structure may obviously be attained by pressing the flat plate first in dies of suitable contour to produce these thin and thick parallel areas, and then by bending this (ribbed) as distinguished from (corrugated) disk in the concavo-convex form.

It is to be noted that in all of the structures described the corrugations extend rectilineally and in parallel lines throughout a concavo-convex disk. This produces distinctly different light diffusing effects from the ordinary form of corrugated or fluted lamp shades and distinctly different effects from a lamp glass or lens which is curved only in one direction. It is the combination of the rectilineal parallel corrugations in a concavo-convex disk which accomplishes the peculiar results here sought after.

While various embodiments of the invention have been herein described and shown, it is to be understood that the construction and arrangement of the lens may be varied within the scope of the appended claim.

What I claim is:

A composite light diffusing lens comprising a plurality of concavo-convex lenses each having corrugations extending rectilineally transversely across the same, said lens being superposed one upon the other with the corrugations of one extending at right angles to the corrugations of the other.

In testimony whereof I, the said LEON J. HOUZE have hereunto set my hand.

LEON J. HOUZE.

Witnesses:
W. W. TAPP,
FRANK N. GANS.